Patented Aug. 30, 1938

2,128,512

UNITED STATES PATENT OFFICE

2,128,512

FREE METHANE-SULPHONIC ACIDS OF PYRAZOLONEAMINES AND PROCESS OF PREPARING THEM

Max Bockmühl and Leonhard Stein, Frankfort-on-the-Main-Hochst, Germany, assignors to Winthrop Chemical Company, Inc., New York, N. Y., a corporation of New York No Drawing. Application January 8, 1935, Serial No. 924. In Germany January 13, 1934

8 Claims. (Cl. 260—310)

Our present invention relates to free methane-sulphonic acids of pyrazoloneamines and to a process of preparing them.

It is known that the omega-alkylsulphonic acids of aromatic amines are produced by causing an aldehyde and sulphurous acid to act upon an aromatic amine. The same acids have been produced by acidifying the alkali metal salts of omega-aminomethanesulphonic acids, obtained by condensing aromatic amines with aldehydes and alkali bisulphite. Though these acids are highly liable to decomposition they may be isolated by taking advantage of their insolubility or sparing solubility in water. The application of the above reactions to the amines of the pyrazolone series has, hitherto, been unsuccessful, since the omega-aminoalkylsulphonic acids of this series are extremely soluble in water and no method has become known for separating the free acids from aqueous solution; moreover, the acids are readily decomposed, as may be recognized by the odor of sulphurous acid shortly after the acidification of the solutions of their salts.

Now we have found that the aminomethylsulphonic acids of the pyrazolone series may be obtained in a solid form from the corresponding amine, formaldehyde and sulphurous acid or by acidifying the salts of the corresponding aminomethanesulphonic acids, the operation being conducted in the presence of organic solvents with complete or partial exclusion of water. As methanesulphonic acids of the pyrazoloneamines there may be used those having the amino group in 4-position, particularly those of the following general formula:

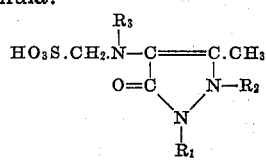

in which $R_1$ stands for a six-membered aromatic or hydroaromatic hydrocarbon radical, $R_2$ for methyl or a six-membered hydroaromatic hydrocarbon radical and $R_3$ for hydrogen, alkyl or a six-membered aromatic or hydroaromatic hydrocarbon radical, for instance, 1-phenyl-2.3-dimethyl-4-methylamino-5-pyrazolone-4-methanesulphonic acid, 1-cyclohexyl-2.3-dimethyl-4-methylamino-5-pyrazolone-4-methanesulphonic acid, 1-(4-methylcyclohexyl)-2.3-dimethyl-4-methylamino-5-pyrazolone-4-methanesulphonic acid, 1-para-tolyl-2.3-dimethyl-4-methylamino-5-pyrazolone-4-methanesulphonic acid, 1-phenyl-2-cyclohexyl-3-methyl-4-methylamino-5-pyrazolone-4-methanesulphonic acid, 1-phenyl-2-(4-methylcyclohexyl)-3-methyl-4-methylamino-5-pyrazolone-4-methanesulphonic acid, 1-phenyl-2.3-dimethyl-4-ethylamino-5-pyrazolone-4-methanesulphonic acid, 1-phenyl-2.3-dimethyl-4-phenylamino-5-pyrazolone-4-methanesulphonic acid, 1-phenyl-2.3-dimethyl-4-para-tolyl-5-pyrazolone-4-methanesulphonic acid, 1-phenyl-2.3-dimethyl-4-cyclohexyl-5-pyrazolone-4-methanesulphonic acid, 1-phenyl-2.3-dimethyl-4-(4-methyl-cyclohexyl)-5-pyrazolone-4-methanesulphonic acid, 1-phenyl-2.3-dimethyl-4-cyclohexenyl-5-pyrazolone-4-methanesulphonic acid, 1-cyclohexyl-2.3-dimethyl-4-amino-5-pyrazolone-4-methanesulphonic acid. As organic solvents there may, for instance, be used lower alcohols and ketones, such as methyl alcohol, ethyl alcohol, propyl alcohol, isopropyl alcohol, acetone, methylethyl ketone, furthermore acetic ester and benzene. If the aminomethylsulphonic acid is easily soluble in the organic solvent used for the preparation, a second organic solvent such as ether or the like may be used at any stage of the process.

The process may, for instance, be carried out by dissolving the amine in question in alcohol, introducing the molecular proportion of sulphurous acid and then adding the molecular proportion of formaldehyde. After addition of a few crystals the new acids then crystallize in most cases. If not, the precipitation may be induced by the addition of ether or another solvent. For the execution of the process it is immaterial in which sequence the different reactants are added. It is, therefore, possible to cause the aminesulphites first prepared to react with the formaldehyde or to cause the amines to react simultaneously with the formaldehyde and sulphurous acid. The Schiff's bases or the methylene-bis compounds of the amines which may be produced from the amines by reaction with the formaldehyde may be transformed with sulphurous acid into the corresponding methylsulphonic acids;

in the latter case a further molecular proportion of formaldehyde is added in order to completely transform the amine into the methylsulphonic acid. With a like success it is also possible to start from the known alkali metal salts of the aminomethylsulphonic acids of pyrazolone-amines, made from the corresponding amines with the aid of formaldehyde and alkalibisulphite (cf. German patent specification 421.505) and to acidify the said alkali metal salts under the above stated conditions. When causing pyrazoloneamines to react with formaldehyde and sulphurous acid it is advantageous to work with solvents miscible with water. When causing methanesulphonic acid salts to react with acids it is also possible to work in the presence of a solvent which is not miscible with water.

It is important for the process of this invention that no substantial amount of water be present. When causing pyrazolone amines to react with formaldehyde and sulphurous acid the presence of water cannot be entirely avoided, since the formaldehyde must be added in the form of an aqueous solution. The amount of water in the total volume of the reaction mixture should, however, not exceed 5 per cent. When causing the salts of methanesulphonic acids to react with mineral acids it is possible to work in the complete absence of water.

The process of our present invention involves various advantages. It is practically difficult to produce in a pure form the monoalkylamino-pyrazolones as they are utilized for the manufacture of pharmaceutical products, since the secondary bases are frequently contaminated with tertiary and primary bases. The present invention offers the possibility of directly obtaining from a crude mixture of amines the methylsulphonic acids of the desired secondary bases. By condensing, for instance, the crude product of 4-methylamino-1-phenyl-2.3-dimethylpyrazolone containing besides the secondary amine quantities of primary and tertiary amine, with formaldehyde and sulphuric acid in an alcoholic solution, the omega-methanesulphonic acid of 4-methylaminopyrazolone which is comparatively more sparingly soluble precipitates very soon, whereas the homologous compound and the tertiary base remain dissolved. Since the omega-aminoethanesulphonic acids may easily be transformed with the aid of an alkali into their salts, chemically pure salts of the omega-methanesulphonic acid of secondary pyrazolone-amines may easily be obtained by starting from a mixture of amines of the 4-amino-pyrazolones.

Furthermore the aminomethanesulphonic acids according to our present invention are intended to be used for the manufacture of new pharmaceutical products.

The following examples illustrate the invention:

(1) 219 grams of 1-phenyl-2.3-dimethyl-4-methylamino-5-pyrazolone are dissolved in 1000 cc. of absolute alcohol and after addition of 75 cc. of formaldehyde of 40 per cent strength 64 grams of sulphurous acid are introduced, while cooling. By continued cooling, the 1-phenyl-2.3-dimethyl-4-methylamino-5-pyrazolone-4-methanesulphonic acid crystallizes after some time. The well crystallized acid is filtered by suction and subsequently washed with a small quantity of alcohol. The yield is almost quantitative; the point of decomposition is at 131° C. to 132° C.

(2) 219 grams of 1-phenyl-2.3-dimethyl-4-methylamino-5-pyrazolone are dissolved in 1000 cc. of acetone and 64 grams of sulphurous acid are introduced into the solution, while cooling. On addition of 75 cc. of formaldehyde of 40 per cent strength and of a few crystals, the methanesulphonic acid obtained according to example 1 crystallizes in an almost quantitative yield. The acid obtained melts with decomposition at 131° C. to 132° C.

The methanesulphonic acid obtainable according to Examples 1 and 2 may be transformed into the corresponding sodium salt by means of caustic soda solution. The magnesium and calcium salts may be obtained in a similar way.

(3) 147 grams of 1-phenyl-2.3-dimethyl-4-benzylamino-5-pyrazolone are dissolved in 1000 cc. of absolute alcohol and 38 cc. of formaldehyde of 40 per cent strength are added, while cooling. 32 grams of sulphurous acid are introduced, while further cooling. After some time the 1-phenyl-2.3-dimethyl-4-benzylamino-5-pyrazolone-4-methanesulphonic acid crystallizes in a yield of 90 per cent. The point of decomposition is at 133° C.

(4) 35 grams of the sodium salt of 1-phenyl-2.3-dimethyl-4-methylamino-5-pyrazolone-4-methanesulphonic acid are dispersed in 200 cc. of alcohol and the solution is mixed with 100 grams of an alcoholic hydrochloric acid of 3.6 per cent strength. When the reaction is complete the whole is filtered. After a short time the methanesulphonic acid described in Examples 1 and 2 crystallizes out. Decomposition point 131° C. to 123° C.

(5) 45 grams of 1-cyclohexyl-2.3-dimethyl-4-methylamino-5-pyrazolone (obtainable according to the co-pending application Serial No. 709,232, filed January 31, 1934, in the name of Max Bockmühl and Walter Krohs) are dissolved in 250 cc. of absolute alcohol, 15 cc. of formaldehyde of 40 per cent strength are added and 13 grams of sulphurous acid are introduced into the solution, while cooling. On addition of ether the 1-cyclohexyl-2.3-dimethyl-4-methylamino-5-pyrazolone-4-methanesulphonic acid crystallizes. Point of decomposition 153° C. to 154° C. Yield 90 per cent.

(6) 223 grams of 4.4'-methylene-bis-1-phenyl-2.3-dimethyl-4-methylamino-5-pyrazolone of the following formula:

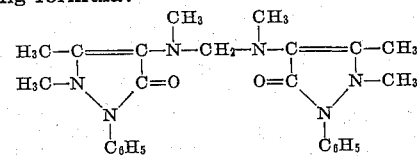

and 37.5 cc. of formaldehyde of 40 per cent strength are dissolved in 1000 cc. of alcohol and 64 grams of sulphurous acid are introduced into the cooled solution. After a short time the 1-phenyl-2.3-dimethyl-4-methylamino-5-pyrazolone-4-methane-sulphonic acid described in Examples 1 and 2 crystallizes out. The yield is quantitative. Point of decomposition 131° C. to 132° C.

(7) 22 grams of 1-cyclohexyl-2.3-dimethyl-4-amino-5-pyrazolone are dissolved in 100 cc. of absolute alcohol and the solution is mixed with 7.8 cc. of a solution of formaldehyde of 40 per cent strength and 4 grams of sulphurous acid. On cooling, the free 1-cyclohexyl-2.3-dimethyl-4-amino-5-pyrazolone-4-methanesulphonic acid crystallizes in a yield of 90 per cent strength.

We claim:

1. The process which comprises causing formaldehyde and sulphurous acid to act upon 1-phenyl- 2.3 - dimethylamino-4-methylamino-5-pyrazolone in the presence of ethyl alcohol and in the absence of a substantial amount of water and isolating the free sulphonic acid.

2. In the process of preparing omega-methanesulphonic acids of 2.3-dialkyl-4-amino-pyrazolones the steps which comprise conducting the step which directly leads to the formation of the free omego-methanesulphonic acid in the presence of an organic solvent in which said acids are substantially insoluble, selected from the class consisting of low molecular aliphatic alcohols, low molecular aliphatic ketones, acetic ester, benzene and ether in the absence of a substantial amount of water, and isolating the free sulphonic acid.

3. In the process of preparing compounds of the following general formula:

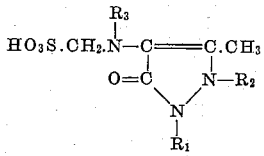

in which $R_1$ stands for a radical of the group consisting of six-membered aromatic and hydroaromatic hydrocarbon radicals, $R_2$ for a member of the group consisting of methyl and a six-membered hydroaromatic hydrocarbon radical and $R_3$ for a member of the group consisting of hydrogen, alkyl and six-membered aromatic and hydroaromatic hydrocarbon radicals, the steps which comprise conducting the step which leads to the formation of the free omega-methanesulphonic acid in the presence of an organic solvent in which said acids are substantially insoluble, selected from the class consisting of low molecular aliphatic alcohols, low molecular aliphatic ketones, acetic ester, benzene and ether, and in the absence of a substantial amount of water and isolating the free sulphonic acid.

4. In the process of preparing compounds of the following general formula:

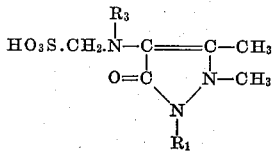

in which $R_1$ stands for a radical of the group consisting of six-membered aromatic and hydroaromatic radicals and $R_3$ for a member of the group consisting of hydrogen and six-membered aromatic and hydroaromatic hydrocarbon radicals, the steps which comprise conducting the step which leads to the formation of the free omega-methanesulphonic acid in the presence of an organic solvent in which said acids are substantially insoluble, selected from the class consisting of low molecular aliphatic alcohols, low molecular aliphatic ketones, acetic ester, benzene and ether, and in the absence of a substantial amount of water and isolating the free sulphonic acid.

5. The process which comprises causing formaldehyde and sulphurous acid to act upon a compound of the following general formula:

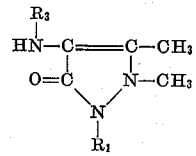

in which $R_1$ stands for a radical of the group consisting of six-membered aromatic and hydroaromatic radicals and $R_3$ for a member of the group consisting of hydrogen and six-membered aromatic and hydroaromatic hydrocarbon radicals, in the presence of an organic water-soluble solvent in which said acids are substantially insoluble, selected from the class consisting of low molecular aliphatic alcohols, low molecular aliphatic ketones, acetic ester, benzene and ether, and in the absence of a substantial amount of water and isolating the free sulphonic acid.

6. A free omega-methanesulphonic acid of a 2.3-dialykl-4-amino-pyrazolone in a dry, solid, crystalline form, which is easily soluble in water and decomposes when melted.

7. A free omega-methane-sulphonic acid of the following general formula:

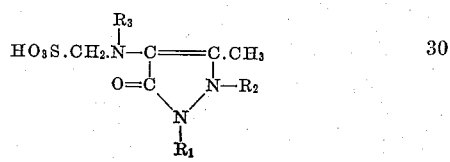

in which $R_1$ stands for a radical of the group consisting of six-membered aromatic and hydroaromatic hydrocarbon radicals, $R_2$ for a member of the group consisting of methyl and a six-membered hydroaromatic hydrocarbon radical and $R_3$ for a member of the group consisting of hydrogen, alkyl and six-membered aromatic and hydroaromatic hydrocarbon radicals, in a dry, solid, crystalline form, which is easily soluble in water and decomposes when melted.

8. A free omega-methanesulphonic acid of the following general formula:

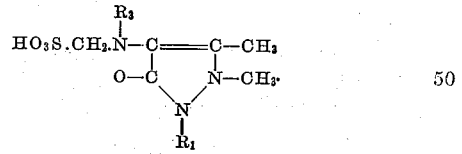

in which $R_1$ stands for a radical of the group consisting of six-membered aromatic and hydroaromatic radicals and $R_3$ for a member of the group consisting of hydrogen and six-membered aromatic and hydroaromatic hydrocarbon radicals, in a dry, solid, crystalline form, which is easily soluble in water and decomposes when melted.

MAX BOCKMÜHL.
LEONHARD STEIN.